(12) United States Patent
Beckmann et al.

(10) Patent No.: US 7,913,040 B2
(45) Date of Patent: Mar. 22, 2011

(54) MANAGING WORKING SET USE OF A CACHE VIA PAGE COLORING

(75) Inventors: Bradford Beckmann, Redmond, WA (US); Bradley M. Waters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/781,172

(22) Filed: May 17, 2010

(65) Prior Publication Data

US 2010/0250890 A1 Sep. 30, 2010

Related U.S. Application Data

(63) Continuation of application No. 11/818,727, filed on Jun. 15, 2007, now Pat. No. 7,747,820.

(51) Int. Cl.
*G06F 13/00* (2006.01)

(52) U.S. Cl. .................. 711/118; 711/E12.058

(58) Field of Classification Search .................. None
See application file for complete search history.

(56) References Cited

U.S. PATENT DOCUMENTS

| | | | |
|---|---|---|---|
| 5,630,097 A | 5/1997 | Orbits et al. | |
| 5,752,261 A | 5/1998 | Cochcroft, Jr. | |
| 6,026,475 A | 2/2000 | Woodman | |
| 6,115,793 A | 9/2000 | Gruber et al. | |
| 6,408,368 B1 | 6/2002 | Parady | |
| 6,523,092 B1 | 2/2003 | Fanning | |
| 7,107,583 B2 | 9/2006 | Hobbs et al. | |
| 7,434,002 B1 * | 10/2008 | Zedlewski et al. | 711/130 |
| 7,444,499 B2 * | 10/2008 | Davis et al. | 712/227 |
| 7,581,064 B1 * | 8/2009 | Zedlewski et al. | 711/118 |
| 2005/0071535 A1 | 3/2005 | Luick | |
| 2006/0036810 A1 | 2/2006 | Accapadi et al. | |
| 2006/0179225 A1 | 8/2006 | Wester et al. | |
| 2007/0067578 A1 | 3/2007 | Kurichiyath | |
| 2007/0124568 A1 * | 5/2007 | Kra | 712/226 |
| 2008/0022065 A1 * | 1/2008 | Gutti et al. | 711/170 |
| 2008/0040554 A1 * | 2/2008 | Zhao et al. | 711/133 |

OTHER PUBLICATIONS

R.E. Kessler et al., "Page Placement Algorithms for Large Real-Indexed Caches", ACM Technologies on Computer Systems, vol. 10, No. 4, Nov. 1992, pp. 338-359.
Brian K. Bray, William L. Lynch, and M. J. Flynn, "Page Allocation to Reduce Access Time of Physical Caches", 1990, by Technical Report No. CSL-TR-90-454 November, pp. 1-12.
Hashemi, et al., "Efficient Procedure Mapping Using Cache Line Coloring", Proceedings of the ACM SIGPLAN 1997 conference on Programming Language Design and Implementation, Date: 1997, pp. 171-182, ACM Press, New York, USA.

\* cited by examiner

*Primary Examiner* — Matt Kim
*Assistant Examiner* — Sean Rossiter

(57) ABSTRACT

A processor cache is indexed by a group of distinct page colors. The use of this cache by different working sets is controlled using page coloring. Translations of virtual addresses of the instructions and/or data of a working set are constrained to physical addresses the page colors of which are in a subgroup of the group of distinct page colors.

20 Claims, 8 Drawing Sheets

MANAGING WORKING SET USE OF A CACHE VIA PAGE COLORING

CROSS-REFERENCE TO RELATED APPLICATIONS

This application claims priority to and is a continuation of U.S. patent application Ser. No. 11/818,727 entitled "Managing Working Set Use of a Cache Via Page Coloring" and filed Jun. 15, 2007 now U.S. Pat. No. 7,747,820, which is incorporated herein by reference.

BACKGROUND

In this description and claims, a "working set" is abstractly defined to be a collection of instructions and/or associated data. For example, a working set could describe all instructions and data allocated by a particular process or thread, a particular data structure within a process's address space, or a thread's or process's most frequently accessed subset of instructions and data. A working set may belong, for example, to any of the following entities: a process, thread or fiber, or an application or service composed of multiple processes. In this description and claims, "entity" is defined as the container or owner of the working set.

As data and instructions are required by the processor of a computer, they are transferred from the main memory of the computer to the processor. The latency inherent in obtaining items from the main memory may be quite large. A cache is a memory that is smaller and accessed more quickly by the processor than the main memory. The processor cache may be located on the chip with the processor, on the processor socket or elsewhere. A page is the unit of memory that is used in main memory management and allocation. Each page is composed of several cache lines, which are the units used in cache memory management. A failed attempt by the processor to access an item in its cache, known as a "cache miss", causes the item to be accessed from the main memory, which adds latency.

Applications running on the computer describe the location of data and instructions using virtual addresses that refer to a virtual address space. The operating system maps or translates the virtual addresses to corresponding physical addresses as needed. If the processor cache is a physically-indexed cache, a portion of the physical address, known as the cache index bits, is used to determine where the item will be copied to in the cache. Therefore, translation or mapping of a virtual address to a physical address by the Operating System implicitly selects the location in the cache where the page will be stored. Since the processor cache is smaller than the main memory and only a portion of the physical address is used as the cache index bits, several physical addresses will map to the same location in the cache.

Consider the example where two threads, thread 1 and thread 2, are simultaneously scheduled on two processor cores that share a cache. Assume that thread 1 accesses a relatively small working set, working set A, that fits within the cache, and that thread 2 accesses a much larger working set, working set B, that exceeds the size of the cache. Current page coloring algorithms may assign the virtual addresses of working set A to physical addresses having the same cache index bits as working set B. Also, processors typically use least recently used (LRU) cache replacement policies or similar policies, which strive to keep the most recently used data in the cache. Thus if thread 2 accesses working set B faster than thread 1 accesses working set A, the processor will allocate the data of working set B into the shared cache and evict the data of working set A. The result is thread 1 will encounter a larger number of cache misses than what would have occurred if thread 2 was not scheduled simultaneously on the adjacent processor core. Thread 1 will therefore experience performance degradation.

Even on a single-core processor, cache competition between heterogeneous working sets may occur when two or more threads or applications are executed simultaneously or time-share a processor. Likewise, cache competition may occur between the working set of a single application and operating system processes or threads.

Most processor caches are N-way set-associative caches. In an N-way set-associative cache, a page whose physical address has a given value of cache index bits can be stored in any of N locations in the cache.

Page coloring is the mechanism an Operating System may use to map virtual addresses to physical addresses with specific cache index bits in order to effect processor cache placement. The value of the physical address bits determining the cache index is known as the page color. For example, if the page size is 4 kilobytes (KB) and the cache is a 4 megabyte (MB) 1-way cache, then there are 1024 distinct page colors. If the page size is 4 KB and the cache is an 8-way set-associative 4 MB cache, then there are 128 distinct page colors. Furthermore, page coloring also influences the location of physical pages within the main memory system. When page coloring is not employed, virtual addresses are mapped to physical addresses without regard for the value of the cache index bits in the physical address.

Current page coloring algorithms tend to distribute the pages of a working set uniformly among the processor cache to the extent possible. Some operating systems implement a page coloring algorithm known as bin hopping, in which pages that are sequentially allocated are mapped to sequential page colors, irrespective of their virtual addresses. Bin hopping exploits temporal locality because the pages it maps close in time tend to be placed in cache locations having different page colors. Bin hopping prevents related pages of a single working set from competing for the same cache lines. However, bin hopping may exacerbate the competition for cache lines between different working sets because all working sets are spread across all page colors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Over the years, the speeds of processors have increased significantly, while the speed of accessing main memory has not kept up the pace. A key to getting good performance and good efficiency from a system is to use processor caches, because they hide the latency of the main memory and enable processes and threads to be executed more quickly. However, when the instructions and/or data of processes and threads compete for the same cache capacity, cache misses can occur. In particular, if certain cache lines are repeatedly evicted, replaced with other information, and then reloaded with the same information that was previously evicted, which is known as "cache thrashing", the performance is severely degraded and many of the benefits of using the processor cache are lost.

Page coloring influences the physical addresses to which virtual addresses of the instructions and/or data in the working sets are translated. When page coloring is employed, a certain portion of the physical address, known as the cache index bits, is given a specific value to correspond to a specific page color. In an N-way set associative cache a page whose physical address has a certain page color can be stored in any of N locations in the cache.

A processor cache may be indexed by a group of distinct page colors. The use of the cache by different working sets may be controlled using page coloring. For example, translations of virtual addresses of the instructions and/or data of a first working set may be constrained to physical addresses the page colors of which are in a first subgroup of the group of distinct page colors. Subsequently, translations of virtual addresses of the instructions and/or data of a second working set may be constrained to physical addresses the page colors of which are in a second subgroup of the group of distinct page colors. If the first subgroup and the second subgroup do not have any page colors in common, then the first working set and the second working set are not competing for the same regions of the cache and cache thrashing between the first working set and the second working set is avoided.

In another example, performance-critical processes may be permitted to use all of the cache or relatively large portions of the cache, while non-performance-critical processes may be constrained to a relatively small portion of the cache. Therefore, it may be less likely that cache misses occur for the working sets of the performance-critical processes.

In yet another example, a debugger may constrain a particular process to a certain portion of the cache (defined by the page colors corresponding to that portion) and then detect memory leaks by observing if the process accesses cache lines outside of the certain portion.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In this description, page coloring is used to manage how heterogeneous working sets use a physically indexed processor cache. The processor cache is indexed by a group of distinct page colors. By constraining translations of virtual addresses of working sets to physical addresses the page colors of which belong to subgroups of the group of distinct page colors, competition for the processor cache or portions thereof may be reduced, enhanced or otherwise controlled.

Although the following description involves caches that store instructions and data, it will be obvious to a person of ordinary skill in the art how to modify the described technology to apply to instruction caches and/or to data caches.

Figure 1:
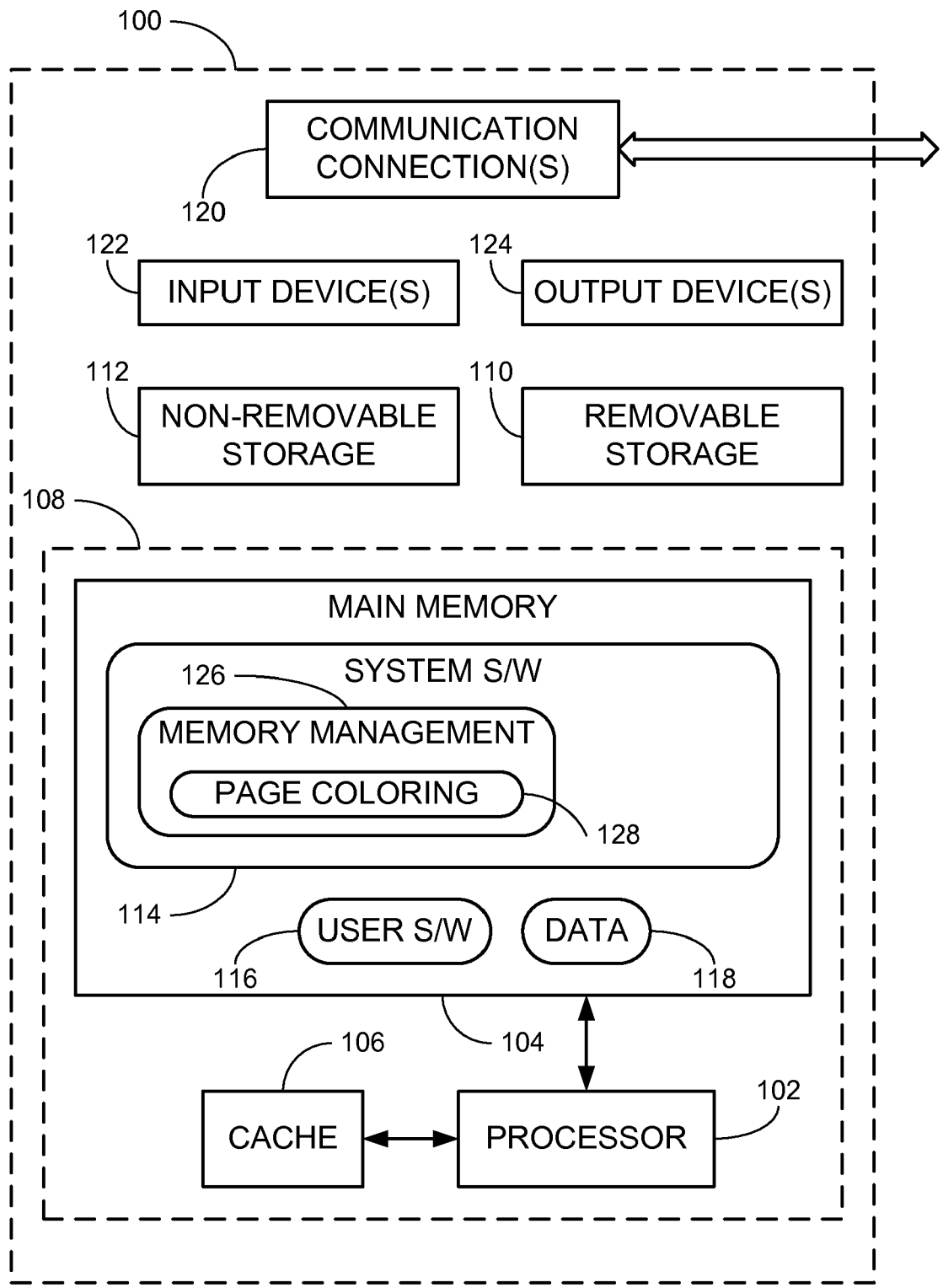
FIG. 1 is an illustration of an exemplary computer environment.

FIG. 1 is an illustration of an exemplary computer system in which the described technology may be implemented. In its most basic configuration, a computer system 100 typically includes a processor 102, a main memory 104 and a processor cache 106. Depending on the exact configuration and type of computing device, main memory 104 may be volatile (such as random access memory (RAM)), non-volatile (such as read-only memory (ROM), flash memory, etc.) or some combination of the two. This most basic configuration is illustrated in FIG. 1 by a dashed line 108.

Some computer systems have multiple layers of processor caches. The lowest cache, e.g. the level 0 (L0) or level 1 (L1) cache, is the smallest and closest to the processor. The higher caches, e.g. the level 2 (L2) or level 3 (L3) cache, are larger and more distant from the processor. Some computer systems have more than one processor and/or more than one core in a processor. Two or more processors and/or processor cores may share a common cache, for example, the largest and most distant cache (which has the highest level). Managing working set use of a processor cache via page coloring may be implemented in a computer system's largest cache or in two or more of the larger caches of the computer system, as appropriate. It may not be feasible to implement management of a cache via page coloring when the cache is so small that it has very few page colors.

Computer system 100 may also include additional storage (removable and/or non-removable), including, but not limited to, magnetic or optical disks or tape. Such additional storage is illustrated in FIG. 1 by removable storage 110 and non-removable storage 112.

Information such as computer-readable instructions, data structures, program modules or other data may be stored in the physical computer storage media of computer system 100, which includes volatile and non-volatile, removable and non-removable media implemented in any method or technology. Programs and instructions that are to be executed by processor 102 and their associated data are stored in main memory 104, copied to main memory from the additional storage if necessary. For example, main memory 104 may store system software 114, user software 116 and their associated data 118. An operating system is an example of system software 114. Applications, guest operating systems, virtual machine managers and managed code environments are some examples of user software 116.

Physical computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired information and which can be accessed by computer system 100. Any such computer storage media may be part of computer system 100.

Computer system 100 may also include communication connection(s) 120 that allow the computer system to communicate with other computer systems, networks and peripheral devices. Communication connection(s) 120 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The term computer-readable media as used herein includes both physical computer storage media and communication media.

Computer system 100 may also comprise input device(s) 122 such as keyboard, mouse, pen, voice input device, touch input device, etc. Computer system 100 may also comprise output device(s) 124 such as a display, speakers, printer, etc. All these devices are well known in the art and need not be discussed at length here.

While FIG. 1 illustrates an example of a computer system that may implement the principles of the described technology, any computer system may implement the features of the described technology. In the description and in the claims, a "computer system" is defined broadly as any hardware component or components that are capable of using software to perform one or more functions. Examples of computer systems include desktop computers, laptop computers, Personal Digital Assistants ("PDAs"), telephones (both wired and mobile), wireless access points, gateways, firewalls, proxies, routers, switches, hand-held devices, multi-processor systems, microprocessor-based or programmable consumer electronics, network PCs, minicomputers, mainframe computers, embedded computing devices (e.g. computing devices built into a car or ATM (automated teller machine)) or any other system or device that has processing capability.

Those skilled in the art will also appreciate that the described technology may be practiced in network computing environments using virtually any computer system configuration. The described technology may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

As processes and/or threads of system software 114 and/or applications 116 are executed by processor 102, working sets of those processes and/or threads are accessed by processor 102. A memory management module 126 in the operating system translates virtual addresses of the working sets to physical addresses in main memory 104. A page coloring module 128, which is part of memory management module 126, is used to ensure that the translation is to a physical address having a specific value of cache index bits, i.e. a specific page color.

In this description, page coloring is used to manage how heterogeneous working sets use a physically indexed processor cache. The processor cache is indexed by a group of distinct page colors. Precisely how the page coloring will be used to manage the use of the processor cache by heterogeneous working sets will vary in different circumstances, but in all cases, at least one of the working sets will have translations of its virtual addresses constrained to physical addresses the page colors of which belong to a particular subgroup of the group of distinct page colors. For ease of illustration, the subgroups of page colors in the examples described below comprise consecutive page colors. However, in other examples, some subgroups of page colors may comprise non-consecutive page colors.

Detecting Memory Leaks

A test environment or debugger may constrain the working set of a particular process to a certain portion of the processor cache (defined by the subgroup of page colors corresponding to that portion) and then detect memory leaks by observing if the process accesses cache lines outside of the certain portion.

Mutually Exclusive Subgroups of Colors

In this case, translations of virtual addresses of a first working set are constrained to physical addresses the page colors of which belong to a first subgroup, and translations of virtual addresses of a second working set are constrained to physical addresses the page colors of which belong to a second subgroup, and the first subgroup and the second subgroup have no page colors in common. Since the subgroups have no page colors in common, there are no cache conflicts between the first working set and the second working set.

The use of mutually exclusive subgroups of colors may be appropriate, for example, if any of the working sets belong to applications having Quality of Service requirements. Examples of such applications include voice over Internet Protocol (IP), streaming video, or other time-bound processes.

The use of mutually exclusive subgroups of colors may be appropriate, for example, if the second working set belongs to a performance-critical process and the first working set belongs to a non-performance-critical process. For example, the first working set may belong to a process doing background index work to support future searches, and the second working set may belong to an application that involves interactions with a user of the computer system. By constraining the first working set to a relatively small portion of the cache, more of the second working set can fit into the cache at the same time, thus enhancing the performance of its application and providing the user with a responsive experience.

The use of mutually exclusive subgroups of colors may be appropriate, for example, if virtual machines are used. A virtual machine (VM) is a logical instance of a computer system implemented through the use of a virtual machine monitor (VMM). The VMM is software that virtualizes the resources of the underlying platform, presenting virtualized disk, virtualized processors, virtualized physical memory, virtualized network interface, and so forth, to the VM. Software that runs in the VM is a "guest", for example, a "guest operating system" and guest applications. In a hosted VMM, the VMM process is treated much like another application on the computer, and shares use of a computer's processor with other applications. A hosted VMM may rely on the computer's operating system to provide device drivers and other lower-level services. An alternative non-hosted VMM is called a "hypervisor", in which the VMM interacts directly with the physical resources. A hypervisor may constrain guest environments to mutually exclusive subgroups of page colors to prevent the separate guest environments from affecting one another's cache performance.

The use of mutually exclusive subgroups of colors may be appropriate, for example, to prevent cache timing security attacks. Such attacks measure timing variations in memory operations to infer whether security keys are stored in the cache or in the main memory and to infer the type of security features on the chip where the processor and cache are located. By constraining working sets of processes to mutually exclusive subgroups of page colors, one process will not be able to influence the cache eviction of the working set of another process. The processes would experience constant-time memory operations and attackers would not be able to make inferences by measuring timing variations.

Figure 2A:
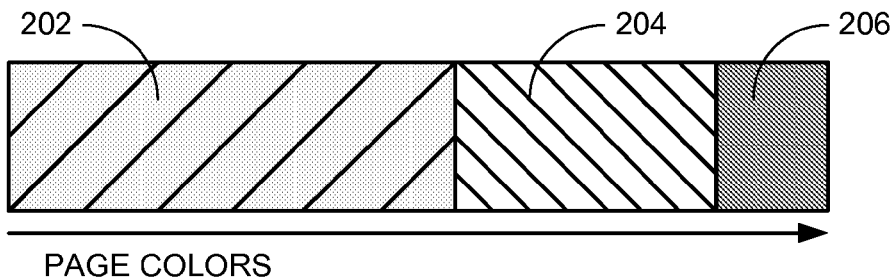
FIGS. 2A-2D are illustrations of exemplary use of a processor cache by working sets.

FIG. 2A is an illustration of exemplary use of a processor cache by three working sets: working set 202, working set 204, and working set 206, which have been constrained to mutually exclusive subgroups of page colors. In one example with 128 distinct page colors in the processor cache, working set 202 is constrained to colors 0 through 69, working set 204 is constrained to colors 70 through 107, and working set 206 is constrained to colors 108 through 127.

Overlapping Subgroups of Colors

In this case, translations of virtual addresses of a first working set are constrained to physical addresses the page colors of which belong to a first subgroup, and translations of virtual addresses of a second working set are constrained to physical addresses the page colors of which belong to a second subgroup, and the first subgroup and the second subgroup have at least one page color in common. The second subgroup may be wholly comprised in the first subgroup.

The use of overlapping subgroups of colors, or having one or more subgroups of colors that are wholly comprised in another subgroup of colors, may be appropriate, for example, if it is desirable to constrain the first working set to a cache portion of a certain size (in page colors) without reducing the size of the cache portion to which the second working set is constrained. Although the overlap of the subgroups may result in more cache misses for the first working set (and for the second working set), this may be limited in time and therefore acceptable if the second working set is not expected to be in the processor cache for very long.

In another example, if processes of the same type are constrained to the same subgroup of page colors, then when these processes coexist, there may be overlapping in the subgroups of page colors actually used for the working sets of these processes.

In a further example, processes may be distinguished from one another on the basis of something other than their priority. For example, some processes may be time-bound while others are not. Some examples of time-bound processes are those interacting with the user, or those that perform precomputation or prefetching before a main task is executed. It is important time-bound processes avoid cache thrashing to accomplish their tasks quickly. Consider constraining time-bound processes to a particular subgroup of page colors, and constraining non-time-bound processes to page colors that are not in that particular subgroup. If the particular subgroup of page colors is large enough, this will ensure that the time-bound processes have access to the necessary amount of cache. While different time-bound processes may compete between themselves for cache storage, they won't have to compete with non-time-bound processes, and thus will avoid most cache thrashing.

Figure 2B:
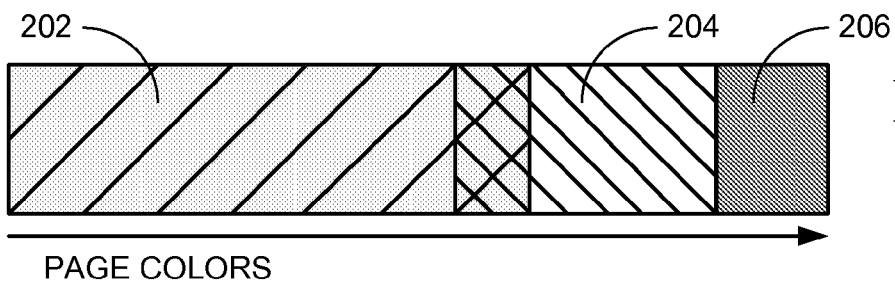

FIG. 2B is an illustration of exemplary use of a cache by working sets 202, 204 and 206. Working set 204 has been constrained to a subgroup of page colors that has at least one page color in common with the subgroup of page colors to which working set 202 has been constrained, and both those subgroups are mutually exclusive with the subgroup of colors to which working set 206 has been constrained. In another example with 128 distinct page colors in the cache, working set 202 is constrained to colors 0 through 89, working set 204 is constrained to colors 70 through 107, and working set 206 is constrained to colors 108 through 127.

In yet another example (not shown) with 128 distinct page colors in the cache, working set 202 is constrained to colors 0 through 107, working set 204 is constrained to colors 70 through 107, and working set 206 is constrained to colors 108 through 127.

At Least One Working Set Unconstrained

In this case, translations of virtual addresses of a first working set are constrained to physical addresses the page colors of which belong to a first subgroup, and translations of virtual addresses of a second working set are permitted to any physical addresses the page colors of which belong to the group.

When the second working set is used in situations when it doesn't collide with other working sets, threads accessing the second working set may encounter fewer cache misses if the second working set is using all of the pages in the cache. Therefore, if the translations for the second working set persist for long periods of time and are not always guaranteed to be colliding with another working set, then not constraining the second working set is a better choice than constraining the second working set to a subgroup of page colors.

Figure 2C:
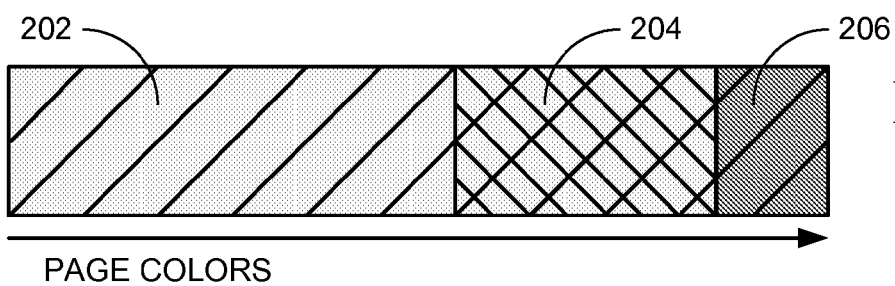

FIG. 2C is an illustration of exemplary use of a cache by working sets 202, 204 and 206. Working sets 204 and 206 have been constrained to mutually exclusive subgroups of page colors, but working set 202 has not been constrained at all.

Two or More Working Sets Constrained to the Same Subgroup

In this case, translations of virtual addresses of a first working set are constrained to physical addresses the page colors of which belong to a first subgroup, and translations of virtual addresses of a second working set are constrained to physical addresses the page colors of which belong to the first subgroup.

The use of identical subgroups may be appropriate in conjunction with one or more mutually exclusive subgroups and/or with an overlapping subgroup and/or with unconstrained working sets. For example, working sets belonging to non-performance critical processes may be constrained to a relatively small portion of the cache, while the remaining portion of the cache is partitioned into mutually exclusive subgroups of page colors for the performance-critical processes. In another example, working sets belonging to processes of lower priority may be constrained to a relatively small portion of the cache, thus encouraging competition between those processes of lower priority for that portion of the cache and enabling a process of higher priority to have exclusive access to the remaining portion of the cache.

Figure 2D:
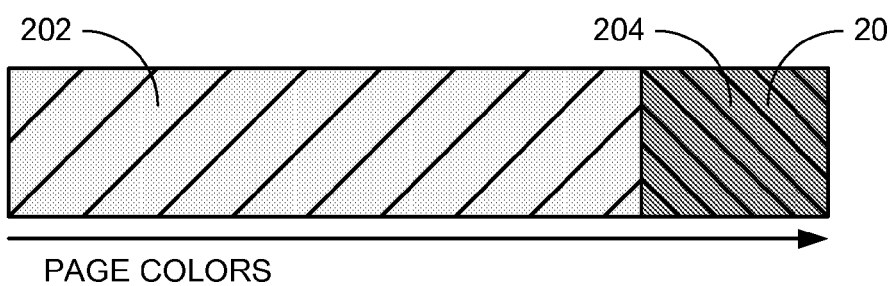

FIG. 2D is an illustration of exemplary use of a cache by working sets 202, 204 and 206. Working sets 204 and 206 have been constrained to the same subgroup of page colors, and that subgroup is mutually exclusive with the subgroup of page colors to which working sets 202 has been constrained. In a further example with 128 distinct page colors in the cache, working set 202 is constrained to colors 0 through 107, and working set 204 and working set 206 are constrained to colors 108 through 127.

Optimization of Intra-Page Layout

Another instance where the use of identical subgroups may be appropriate is where intra-page layout can be optimized to accommodate hot data of two or more pages. A working set that is heavily accessed by the processor is known as "hot data", although it could include instructions and/or data.

Consider the case where two pages, page X and page Y, each contain hot data. If the working set of hot data of page X is constrained to a particular page color and the working set of hot data of page Y is constrained to the same page color, and other working sets are constrained to other page colors, then the hot data of page X and the hot data of page Y are isolated from the other working sets and the likelihood that the hot data will be evicted from the cache by less important information is reduced. However, if there is an overlap in the cache line use of the hot data of page X and the hot data of page Y, then there will be conflicts between those two working sets for the same cache lines.

Figure 3A:
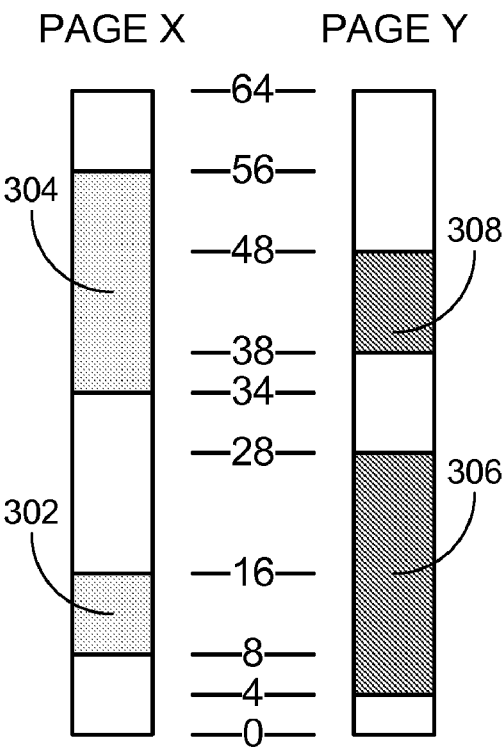
FIGS. 3A and 3B are illustrations of the exemplary distribution of hot data among cache lines.

An example of such an overlap is illustrated in FIG. 3A, which shows an exemplary distribution of hot data among cache lines in a cache having 64 cache lines per page. In the example shown in FIG. 3A, hot data 302 of page X and hot data 304 of page X are stored in cache lines 8 through 15 and 34 through 55, respectively. Hot data 306 of page Y and hot data 308 of page Y are stored in cache lines 4 through 27 and 38 through 47, respectively.

Figure 3B:
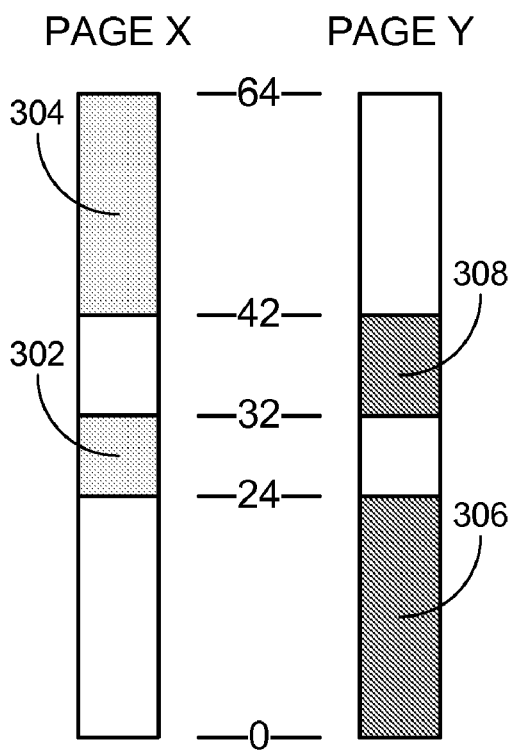

A programmer or compiler may avoid these conflicts by optimizing the layout of cache lines within the page. FIG. 3B shows an exemplary optimized distribution of hot data among cache lines. In the example shown in FIG. 3B, hot data 302 and hot data 304 are stored in cache lines 24 through 31 and 42 through 63, respectively, and hot data 306 and hot data 308 are stored in cache lines 0 through 23 and 32 through 41, respectively. Since the hot data of page X and the hot data of page Y do not overlap, they are more likely to be located in the cache if the working set of hot data of page X and the working set of hot data of page Y are constrained to the same page color and other working sets are constrained to other page colors.

Software Stacks

Figure 4:
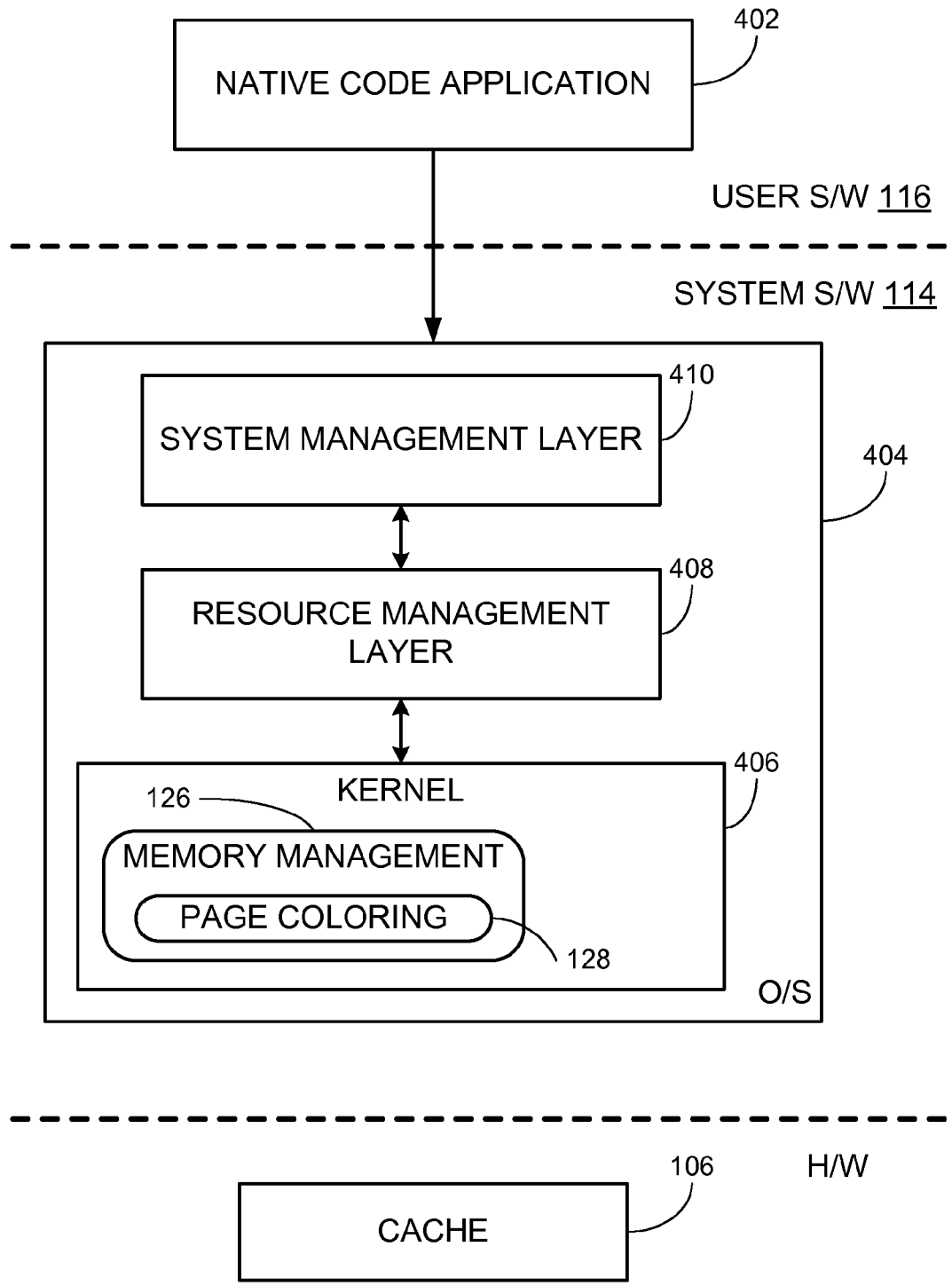
FIG. 4 is an illustration of an exemplary software stack in which page coloring may be used to manage the use of a processor cache by working sets.

FIG. 4 is an illustration of an exemplary software stack in which page coloring may be used to manage the use of a cache by working sets. A native code application 402 runs on top of an operating system 404, which comprises multiple layers. Within this native environment, a kernel 406 provides the page coloring mechanism and provides a page coloring interface to upper layers of the operating system and to the applications. Operating system layers above kernel 406 may implement particular page coloring policies. For example, a resource management layer 408 coupled to kernel 406 may split cache 106 or a portion thereof between multiple applications to ensure that Quality of Service requirements of one or more of the applications are taken into account. In another example, to improve overall system performance, a system management layer 410 coupled to resource management layer 408 may assign a greater number of page colors to performance-critical processes than to non-performance-critical processes. In yet another example, native code application 402 may use an operating system interface to request that a particular working set use only a certain percentage of cache 106.

Figure 5:
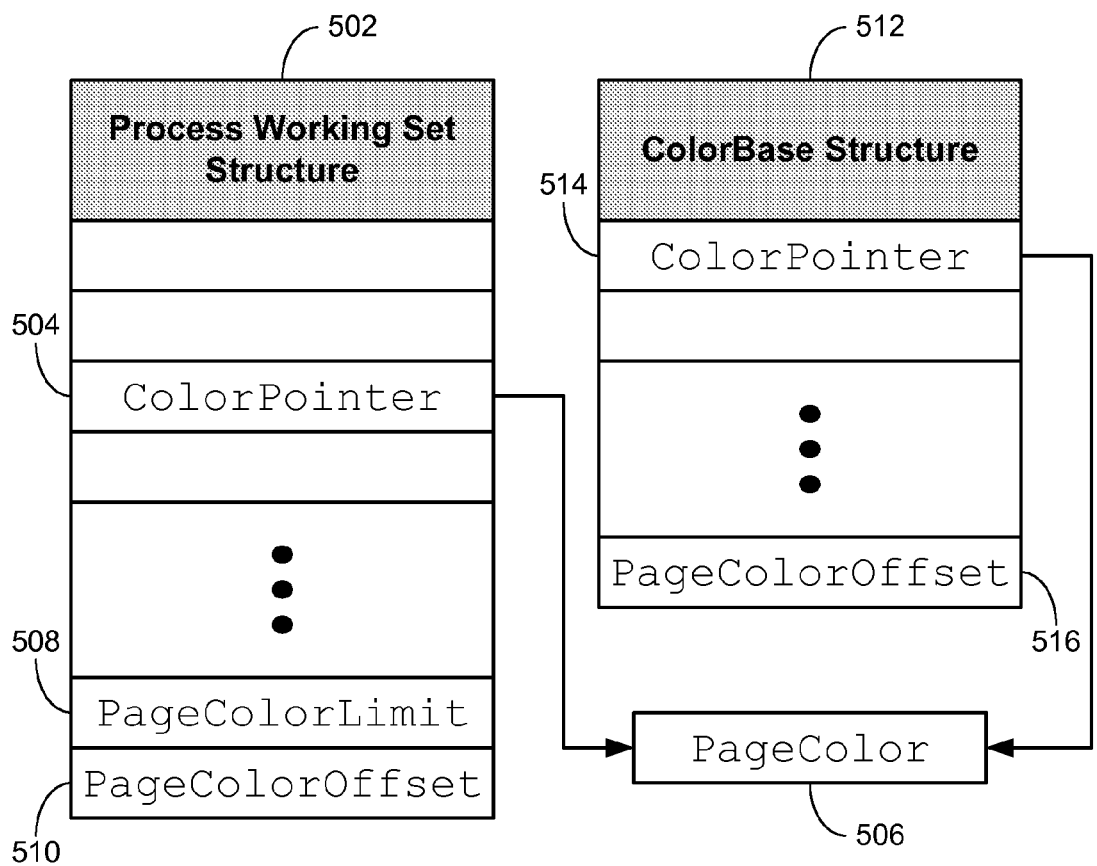
FIG. 5 is an illustration of exemplary data structures for use when implementing page coloring within an operating system's memory management module.
Figure 6:
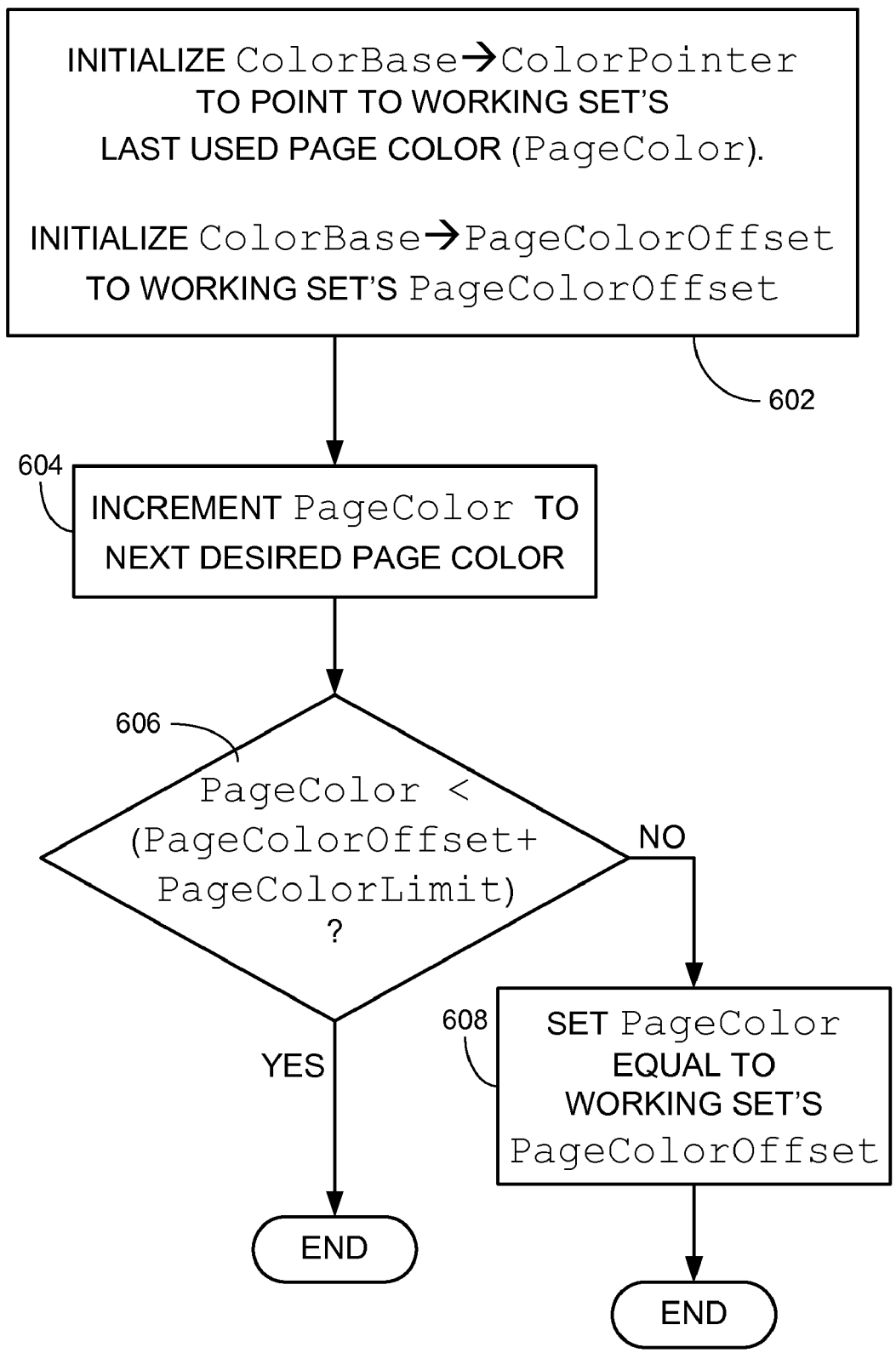
FIG. 6 is a flowchart of an exemplary method for page coloring.

FIG. 5 is an illustration of exemplary data structures for use when implementing the page coloring within an operating system's memory management module. FIG. 6 is a flowchart of an exemplary method for page coloring. Although previously a working set was abstractly defined to be a collection of instructions and/or associated data, the term "working set", when used in the description of FIGS. 5 and 6, has a more limited meaning of the amount of a process's virtual address space that is resident within physical memory.

A memory management module will allocate physical pages to virtual pages. A process working set structure 502 comprises a ColorPointer field 504 which points to the last PageColor 506 used by the working set, a PageColorLimit field 508, and a PageColorOffset field 510. By default, the PageColorLimit equals the total number of page colors available within the largest processor cache, which is appropriate for an unconstrained working set. However, a process may reduce this value using an application programming interface (API) described hereinbelow. By having different page color offsets, different working sets may be constrained to different subgroups of page colors. By default, the value of PageColorOffset field 510 equals zero. However, the memory management module may set the PageColorOffset field 510 of a constrained working set to a nonzero value. For example, in a cache indexed by 128 distinct page colors, a working set constrained to page colors 64 through 83 will have a PageColorLimit field 508 with a value of 20 and a PageColorOffset field 510 with a value of 64.

Some operating systems have an API that permits processes to set their minimum and maximum working set size. Such an API may be extended to allow different entities to set a limit for its page colors. Through the use of the API or a tool using the API, a process, run time environment or system manager may want to limit their cache capacity usage, and may therefore set their PageColorLimit field to a value less than the total number of available page colors. Similarly, the PageColorOffset field could be set to a value such that the PageColorOffset+PageColorLimit is less than the total number of available page colors.

A ColorBase structure 512 comprises a ColorPointer field 514 and a PageColorOffset field 516. Before allocating a virtual page into physical memory, at 602, the memory management module initializes ColorPointer field 514 to also point to the last PageColor 506 used by the working set and initializes PageColorOffset field 516 to have the same value as PageColorOffset field 510.

At 604, the memory management module increments PageColor 506 to the next desired page color. For example, if the working set's last page color is 67, the next desired page color may be 68. Incrementing PageColor 506 may be expressed in code as follows: PageColor++.

At 606, the memory management module checks whether the incremented value of PageColor 506 is less than the sum of the PageColorOffset field 516 and the working set's PageColorLimit field 508. If not, then at 608, the page color is reset to the value of PageColorOffset field 516, which may be expressed in code as follows: PageColor=PageColorOffset. For example, if the working set's last page color is 83, the PageColorLimit field 508 has a value of 20 and the PageColorOffset field 510 has a value of 64, then after incrementing, PageColor is reset to 64.

The method of FIG. 6 is a modification of a bin hopping method, in that pages of a working set that are sequentially allocated are mapped to sequential page colors, subject to the page color limit of the working set.

Figure 7:
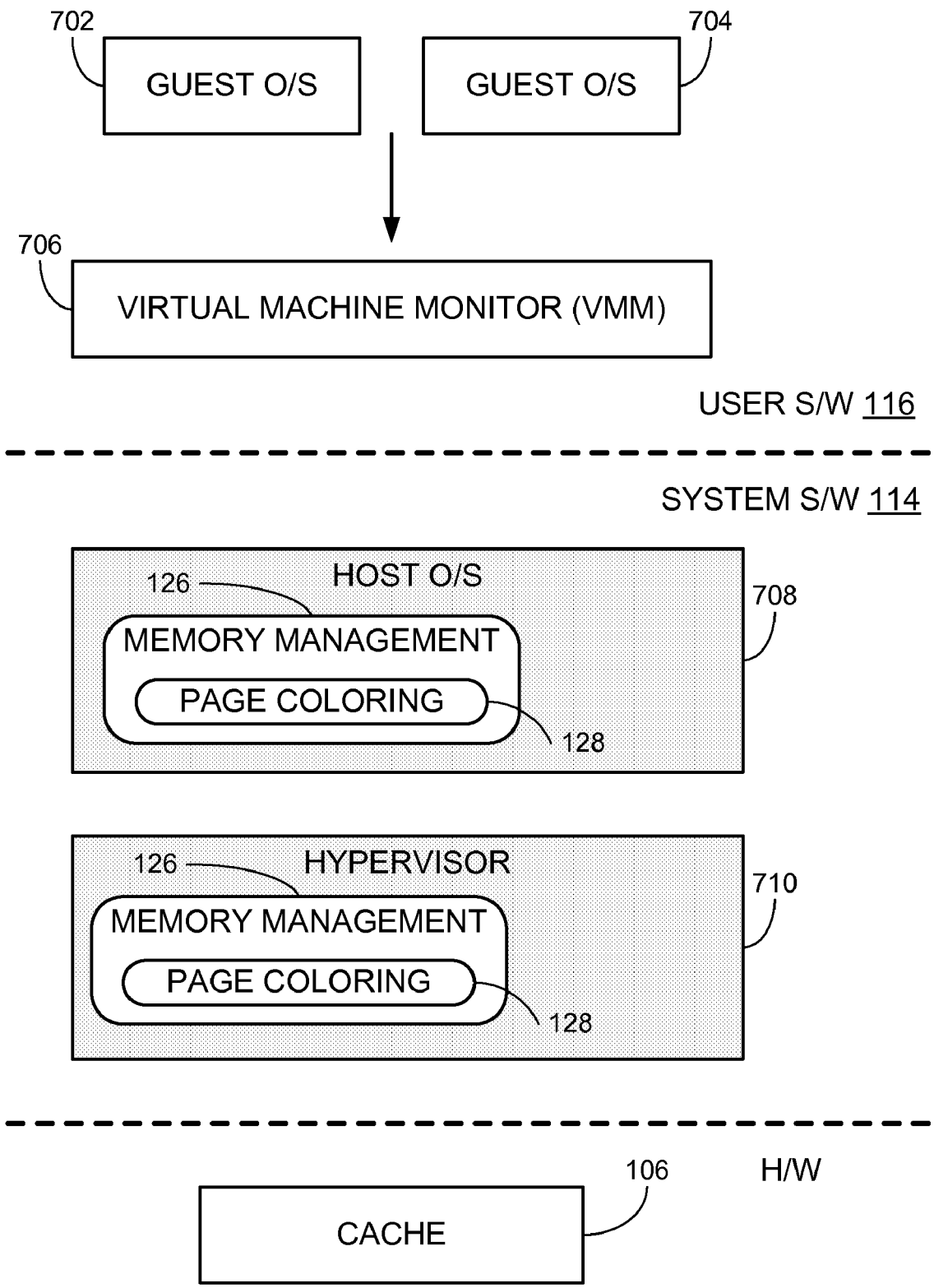
FIG. 7 is an illustration of another exemplary software stack in which page coloring may be used to manage the use of a processor cache by working sets.

FIG. 7 is an illustration of another exemplary software stack in which page coloring may be used to manage the use of a cache by working sets. Guest applications, for example, guest operating systems 702 and 704, run in a virtual machine implemented through the use of a virtual machine monitor 706. VMM 706 may implement a policy, for example, that assigns guest environments to mutually exclusive subgroups of page colors. The page coloring mechanism may be implemented by an enlightened host operating system 708 that supports VMM 706. In this context, an enlightened host operating system understands that it is supporting one or more guest environments above it. Alternatively, the page coloring mechanism may be implemented by a hypervisor 710. In either case, an interface to the page coloring mechanism may be presented so that VMM 706 is able to influence the page coloring in accordance with whatever policy it is implementing.

Figure 8:
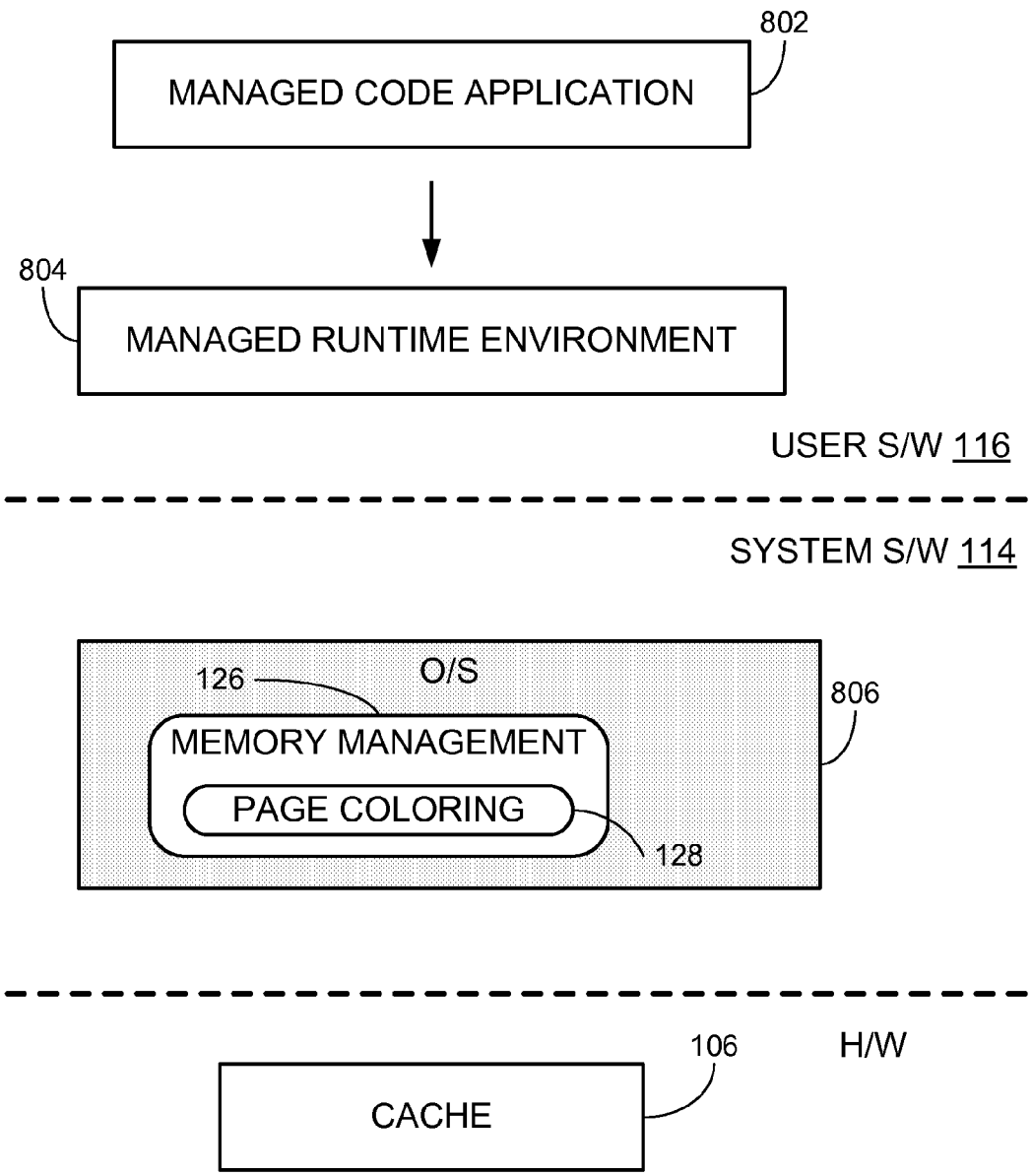
FIG. 8 is an illustration of yet another exemplary software stack in which page coloring may be used to manage the use of a processor cache by working sets.

FIG. 8 is an illustration of yet another exemplary software stack in which page coloring may be used to manage the use of a cache by working sets. A managed code application 802 is typically generated on demand from code written in a higher-level programming language. Managed code application 802 is generated by a runtime-aware compiler (not shown) in a managed runtime environment 804 when the application is run. Certain aspects of the memory management may be done by managed runtime environment 804 instead of by the programmer of the code. Managed runtime environment 804 is supported by an operating system 806, which implements the page coloring mechanism and may present an interface to managed runtime environment 804 so that managed runtime environment 804 is able to influence the page coloring in accordance with a policy. For example, managed runtime environment 804 may support a security feature that isolates a thread's working set from all other working sets before executing cryptographic functions.

Although the various software stacks in FIGS. 5, 7 and 8 are illustrated separately for clarity, two or more of these software stacks may be present at any given time in a computer system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium having computer-executable instructions for performing steps comprising:
    initializing a pointer to point to a page color most recently used for a particular working set;
    incrementing a page color value to generate an incremented page color value for use when next allocating memory and translating a virtual address of the particular working set to a physical address; and
    if the incremented page color value exceeds a limit for the particular working set, resetting the incremented page color value to a page color offset for the particular working set prior to use of the incremented page color value for allocating memory and translating the virtual address to the physical address.

2. The computer-readable storage medium of claim 1, wherein the limit for the particular working set equals a total number of page colors available within a largest processor cache.

3. The computer-readable storage medium of claim 1, wherein the limit for the particular working set is less than a total number of available page colors.

4. The computer-readable storage medium of claim 1, further comprising allocating memory for a second working set.

5. The computer-readable storage medium of claim 4, wherein the second working set and the particular working set have different page color offsets.

6. The computer-readable storage medium of claim 4, wherein the second working set and the particular working set have the same page color offsets.

7. The computer-readable storage medium of claim 4, wherein the second working set and the particular working set have at least one page color in common.

8. The computer-readable storage medium of claim 1, using the incremented page color value for allocating memory and translating the virtual address to the physical address.

9. A method for page coloring memory in a computer, comprising:
    initializing a pointer to point to a page color most recently used for a particular working set;
    incrementing a page color value to generate an incremented page color value for use when next allocating memory and translating a virtual address of the particular working set to a physical address; and
    if the incremented page color value exceeds a limit for the particular working set, resetting the incremented page color value to a page color offset for the particular working set prior to use of the incremented page color value for allocating memory and translating the virtual address to the physical address.

10. The method of claim 9, wherein the limit for the particular working set equals a total number of page colors available within a largest processor cache.

11. The method of claim 9, wherein the limit for the particular working set is less than a total number of available page colors.

12. The method of claim 9, further comprising allocating memory for a second working set.

13. The method of claim 12, wherein the second working set and the particular working set have different page color offsets.

14. The method of claim 12, wherein the second working set and the particular working set have the same page color offsets.

15. The method of claim 12, wherein the second working set and the particular working set have at least one page color in common.

16. The method of claim 12, using the incremented page color value for allocating memory and translating the virtual address to the physical address.

17. A computing device, comprising:
    a memory comprising:
        a process working set structure for a particular working set comprising a color pointer, a page color limit and a page color offset;
        a color base structure, the color base structure comprising a color pointer and a page color offset;
        a page color value;
    a processor to allocate physical pages to virtual pages by:
        initializing the color pointer of the color base structure to point to a page color most recently used for the particular working set;
        initializing the page color offset of the color base structure to the page color offset of the particular working set;
        incrementing the page color value to generate an incremented page color value for use when next allocating memory and translating a virtual address of the particular working set to a physical address; and
        if the incremented page color value exceeds a limit for the particular working set, resetting the incremented page color value to the page color offset for the particular working set prior to use of the incremented page color value for allocating memory and translating the virtual address to the physical address.

18. The computing device of claim 17, wherein the limit for the particular working set equals a total number of page colors available within a largest processor cache.

19. The computing device of claim 17, wherein the limit for the particular working set is less than a total number of available page colors.

20. The computing device of claim 17, wherein the processor is further adapted to use the incremented page color value for allocating memory and translating the virtual address to the physical address.

* * * * *